(12) United States Patent
Muthusamy (10) Patent No.: US 10,410,445 B2
(45) Date of Patent: Sep. 10, 2019

(54) SYSTEM AND METHOD FOR PARKING UTILIZATION WITHIN A PLURALITY OF PARKING LOTS

(71) Applicant: Yeshvik Solutiions, LLC, Allen, TX (US)

(72) Inventor: Yeshwant Kumar Muthusamy, Allen, TX (US)

(73) Assignee: YESHVIK SOLUTIIONS, LLC, Allen, TX (US)

( * ) Notice: Subject to any disclaimer, the term of this patent is extended or adjusted under 35 U.S.C. 154(b) by 0 days.

(21) Appl. No.: 15/912,459

(22) Filed: Mar. 5, 2018

(65) Prior Publication Data
US 2018/0253916 A1 Sep. 6, 2018

Related U.S. Application Data

(60) Provisional application No. 62/467,252, filed on Mar. 6, 2017.

(51) Int. Cl.

| | |
|---|---|
| G07C 9/00 | (2006.01) |
| G06Q 20/34 | (2012.01) |
| H04W 4/029 | (2018.01) |
| G08G 1/14 | (2006.01) |
| G08G 1/01 | (2006.01) |
| G08G 1/017 | (2006.01) |
| H04L 29/08 | (2006.01) |
| H04W 4/44 | (2018.01) |
| G07B 15/02 | (2011.01) |

(52) U.S. Cl.
CPC ......... *G07C 9/00103* (2013.01); *G06Q 20/34* (2013.01); *G07B 15/02* (2013.01); *G08G 1/017* (2013.01); *G08G 1/0112* (2013.01); *G08G 1/0133* (2013.01); *G08G 1/143* (2013.01); *G08G 1/144* (2013.01); *G08G 1/148* (2013.01); *G08G 1/149* (2013.01); *H04L 67/306* (2013.01); *H04W 4/029* (2018.02); *H04W 4/44* (2018.02); *H04L 67/12* (2013.01)

(58) Field of Classification Search
None
See application file for complete search history.

(56) References Cited

U.S. PATENT DOCUMENTS

| | | |
|---|---|---|
| 6,945,303 B2 | 9/2005 | Weik |
| 7,783,530 B2 | 8/2010 | Slemmer et al. |
| 8,461,983 B2 | 6/2013 | McCauley |
| 8,624,727 B2 | 1/2014 | Saigh et al. |

(Continued)

*Primary Examiner* — Thomas S McCormack
(74) *Attorney, Agent, or Firm* — Nolte Intellectual Propery Law Group (57) ABSTRACT

A parking system includes: electronic parking passes that can be virtual parking passes or physical parking devices within vehicles; a network of connected wireless communication hubs; computer servers, associated software, and driver information databases (collectively called the Cloud Backend); and registered parking applications on mobile devices of vehicle drivers. All system components are interconnected and able to communicate with one another, creating a "Driver Parking and Safety Net" that enables drivers to find parking, make secure payments for parking transactions, dynamically upgrade their parking authorization levels on a temporary basis, and monitor for safety of the drivers even while they are away from their vehicles.

19 Claims, 8 Drawing Sheets

(56) References Cited

U.S. PATENT DOCUMENTS

| | | |
|---|---|---|
| 8,665,089 B2 | 3/2014 | Saigh et al. |
| 8,928,478 B2 | 1/2015 | Vallaire |
| 9,721,305 B2 | 8/2017 | Bomze et al. |
| 9,754,487 B1 | 9/2017 | Woodard et al. |
| 2014/0062727 A1* | 3/2014 | Aivas ................... G08G 1/146 340/932.2 |
| 2017/0098374 A1* | 4/2017 | Sullivan ................ G06F 17/00 |
| 2017/0278023 A1* | 9/2017 | Rosen ................... G08G 1/015 |

* cited by examiner

SYSTEM AND METHOD FOR PARKING UTILIZATION WITHIN A PLURALITY OF PARKING LOTS

RELATED APPLICATIONS

The present application is related to and claims benefit under 35 U.S.C. § 119(e) from U.S. Provisional Patent Application Ser. No. 62/467,252 filed Mar. 6, 2016, titled "Systems and Method for Creating a Safety Net for Drivers" the entire contents of which is incorporated herein by reference.

BACKGROUND

Parking your vehicle can be expensive, limited, confusing and in many cases, unsafe. Many parking spaces go unused simply because people are not aware of them, or are not willing to look for them, due to the time it takes to do so. Getting to and from these parking lots or garages often puts people in avoidable danger. Current solutions include mobile applications ("apps") for parking that usually work only for pay-by-space parking spaces. These mobile apps do not provide coverage for free parking facilities, or permit parking facilities, typically found in universities or any other organization that offers parking by different permits or authorization levels. These apps also do not provide information on multiple parking locations of the same type or authorization level (e.g., "gold" lots, "silver" lots, free economy lots, etc.) that might be geographically distributed across a wide area within the same campus. Also, there are no safety features built into any of these mobile parking apps that could save a person's life in case of emergencies or physical assault as they walk to and from their vehicle.

BRIEF SUMMARY

The teachings herein include systems and methods that make finding parking easy and safe for a driver of any vehicle, wherein the driver is also referred to in the instant specification as a user. In one particular embodiment, and not necessarily the broadest embodiment, of the present teachings, a parking system includes the following components: (i) a multiplicity of sensors deployed on a parking device (also referred to herein as a multi-sensor parking device or multi-sensor device) within the driver's vehicle, (ii) one or more computer programs (called mobile applications or just mobile apps and parking applications) on the driver's wireless personal device (e.g., a smartphone or a tablet), (iii) one or more wireless parking communication hubs, also referred to herein simply as communication hubs, network hubs, or hubs, connected to each other, and (iv) software on one or more remote computer servers, along with a secure database of driver information (collectively called the Cloud Backend). All the components of the parking system are interconnected with one another to help the driver find parking easily and be safe as he or she walks away or towards the parked vehicle.

For a particular embodiment, the multiple sensors within the vehicle can communicate with the mobile app (while the driver is in proximity to the vehicle) and with the network hub closest to it. The network hubs communicate with each other, with the mobile app (as the driver walks past them), and with the Cloud Backend. The Cloud Backend communicates directly with the mobile app, as needed. All components of the system are connected with one another to form a Driver Parking and Safety Net (DPSN) for the driver at all times, even when the driver is away from the vehicle. Alternate embodiments of the system could have fewer components, but still provide similar protection via the Driver Parking and Safety Net.

For example, in an alternate embodiment of the present teachings, the vehicle might not have any sensors, but still afford similar safety protections (albeit with some reduced functionality) to the driver using one or more mobile applications on the driver's personal device, one or more interconnected wireless communication hubs, and the Cloud Backend. Yet another embodiment of the system could incorporate mechanisms for secure automatic payment for the parking using a combination of information in the multi-sensor device (if present), the mobile applications, and the Cloud Backend, that taken together establish the identity of the driver and enable the financial transaction to be completed. Each piece of the information is not sufficient by itself to uniquely identify the driver or complete the financial transaction. This ensures that even if one piece of information were to be compromised, or fall into the wrong hands, the financial transaction cannot be completed.

BRIEF DESCRIPTION OF THE DRAWINGS

The accompanying figures, for which like reference numerals refer to identical or functionally similar elements throughout the separate views, together with the detailed description below, are incorporated in and form part of the specification. The figures serve to illustrate embodiments of concepts included in the claims and to show various features and advantages of those embodiments.

The present disclosure is illustrated in part with examples, as reflected by disclosed embodiments, and is not limited by the accompanying figures, in which like reference numbers indicate similar elements. Skilled artisans will appreciate that elements in the figures are illustrated for simplicity and clarity and have not necessarily been drawn to scale. For example, the dimensions of some of the elements in the figures may be exaggerated relative to the dimensions of other elements to help to improve understanding of embodiments implicitly or explicitly disclosed herein.

The apparatus and method components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Also, the operations included in the flow diagrams do not imply a required order in performing the functionality contained therein.

DETAILED DESCRIPTION

Figure 1:
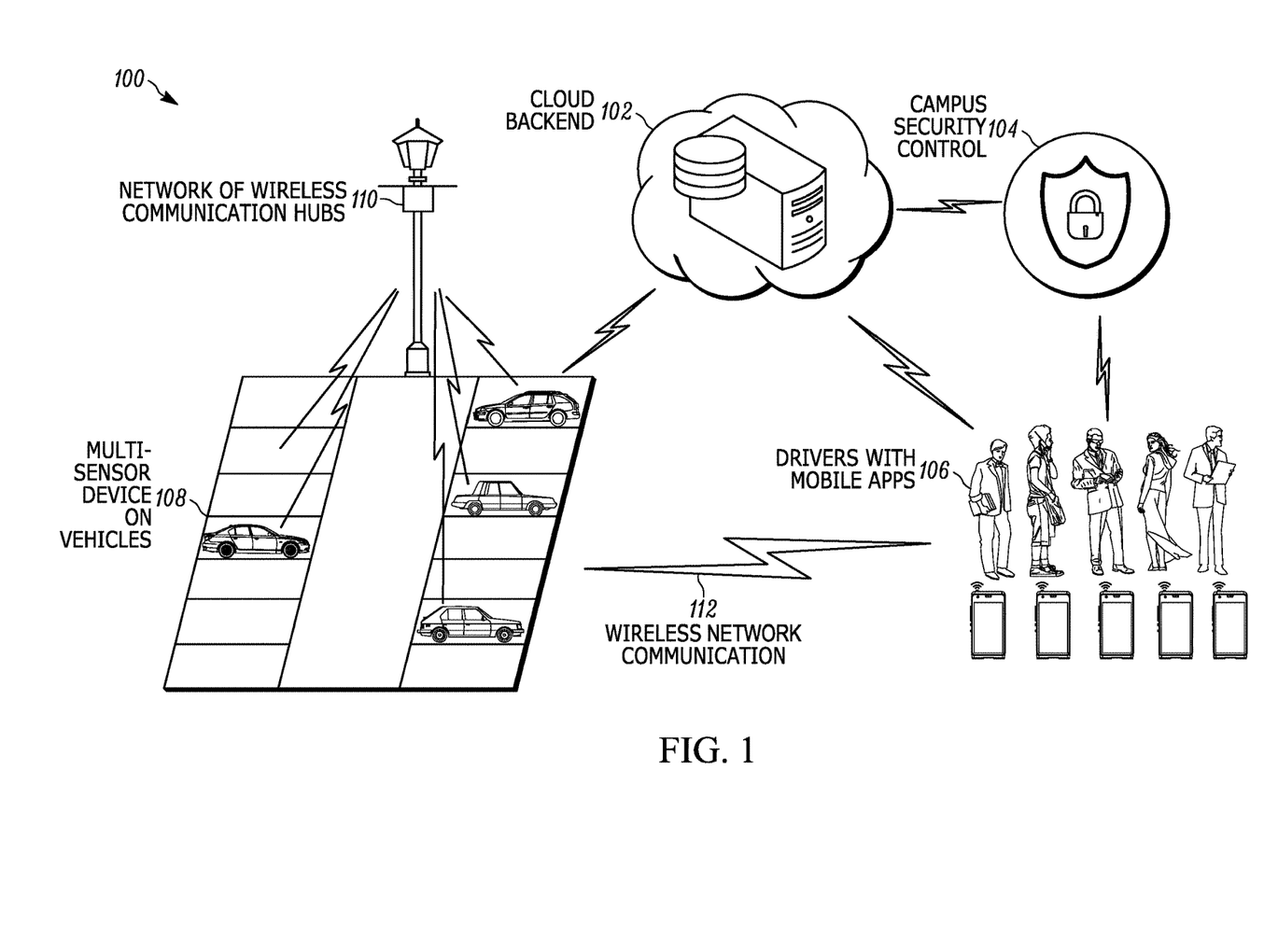
FIG. 1 shows the high-level architecture of one embodiment of a parking system according to the present teachings, pertaining to a university or college environment.

The disclosure describes systems and methods that can make finding parking easy and safe for the driver of any vehicle. FIG. 1 shows one embodiment of a parking system 100 in a university setting, in accordance with an embodiment of the present teachings. It has a multi-sensor parking device 108 (deployed on each vehicle) that communicates wirelessly with a wireless communication hub 110. Each multi-sensor device has a unique, non-personal ID, referred to herein as a parking pass identifier, which cannot be modified by the user. The multi-sensor parking device is one example of an electronic parking pass in accordance with the present teachings. An electronic parking pass provides a user with authorized access to at least one parking lot of a plurality of parking lots of a parking system. An electronic parking pass can alternatively be a virtual parking pass that is not linked to a physical parking device.

As described in more detail by reference to FIG. 4, at a minimum, the parking device includes a parking device communication interface and parking device storage coupled to the parking device communication interface and having the parking pass identifier stored thereon. For another embodiment, and to enable additional functionality within the parking system, the parking device also includes a set of sensors configured to detect a set of parameters; and a parking device processor programmed to use the detected set of parameters to determine a security breach event for a vehicle that contains the parking device. Another use of the set of sensors is for indoor positioning and location determination (e.g., in enclosed parking structures, where GPS connectivity may not be available or might be weak). In one embodiment of this technique, known in the art as pedestrian dead reckoning (PDR), the accelerometer, gyroscope, magnetometer, and pressure sensor can be used to determine the position of the vehicle within a parking structure, and this location can be conveyed to a Cloud Backend, using the wireless connection to the nearest communication hub. Further, since these sensors are typically also available within a smartphone, location of the drivers within such structures can also be determined using PDR and conveyed to the Cloud Backend via the hubs.

The hub is part of a network of similar hubs, all of which are connected to one another and spread out over the university campus. The hubs are also connected to one or more remote computer servers, associated software and secure driver databases in the cloud (collectively called the "Cloud Backend" 102). The Cloud Backend, at a minimum, includes: a server communication interface; a server processor coupled to the server communication interface; a stored profile for a user, the user's profile comprising a parking pass identifier for an electronic parking pass, a parking authorization level associated with the electronic parking pass, and user data identifying the user and registration of a parking application on a user device; stored parking utilization data indicating current utilization for a plurality of parking lots, wherein the parking utilization data is determined based on multiple parking pass identifier inputs received from a plurality of parking communication hubs; and stored code executable by the server processor, wherein the code is configured to use the user's profile and the parking utilization data as input to determine at least one of the plurality of parking lots within which the user is authorized to park and to output a user parking authorization indication for communicating to the registered parking application using the server communication interface, the details of the operation of which are described by reference to other figures. As described in more detail by reference to FIG. 5, each hub 110 includes, at a minimum, a hub communication interface configured to wirelessly connect to the server communication interface and the parking device communication interface; and a hub processor coupled to the hub communication interface and configured to retrieve the parking pass identifier from the parking device and provide the parking pass identifier as one of the multiple parking pass identifier inputs to the Cloud Backend.

The university/college campus security control facility 104 has secure access to the information on the Cloud Backend. Further, the Cloud Backend is connected wirelessly to one or more applications on the drivers' personal mobile devices 106. Finally, the applications on the drivers' personal mobile devices are also connected wirelessly to the multi-sensor devices on or within the vehicles (collectively referred to as being within the vehicles regardless of whether the devices are located inside or outside of the vehicles or is attached or detached from the vehicle), whenever the driver is within range of the multi-sensor device. This wireless interconnection 112 between all the components of the system creates a Driver Parking and Safety Net (DPSN) that allows the system to monitor and track the driver, even when the driver is not in the vehicle. The ID of each multi-sensor device can further uniquely identify the vehicle, and by extension, the driver, to the Cloud Backend and help track both the vehicle and the driver. The Cloud Backend uses this multi-sensor device ID to retrieve a corresponding driver record (also referred to herein as a profile for a user or a user's profile). To address privacy concerns, the driver always has the option of turning off the monitoring feature of the system on his or her personal mobile device, with the clear understanding that the safety feature of the system could potentially be compromised by turning off the monitoring/tracking feature.

Although a university setting was used to describe one embodiment of the present teachings, alternate embodiments of the present teachings are applicable to several other settings as well, with similar functionality. Other settings include, but are not limited to, office/business parking lots, shopping malls, airports, car rental agencies, sports and entertainment venues, or any venue that requires people to park their vehicles in open or covered parking structures. The parking could be free, via permit, or via pay-per-space lots.

Example benefits of the present teachings include, but are not limited to, the system allows drivers to easily locate available parking consistent with their authorization (i.e., permit, pre-paid level, etc.) and ensures their safety while they are away from their vehicle and allows them to safely return to their vehicle and automatically pay for their parking (in cases of paid parking lots). Further, since each vehicle is uniquely identified by or associated with the multi-sensor device ID, changing the parking authorization for a vehicle is simply a matter of dynamically changing the authorizations (or "rights") associated with that multi-sensor device ID on the Cloud Backend, eliminating the need to issue new physical parking permits.

Figure 2:
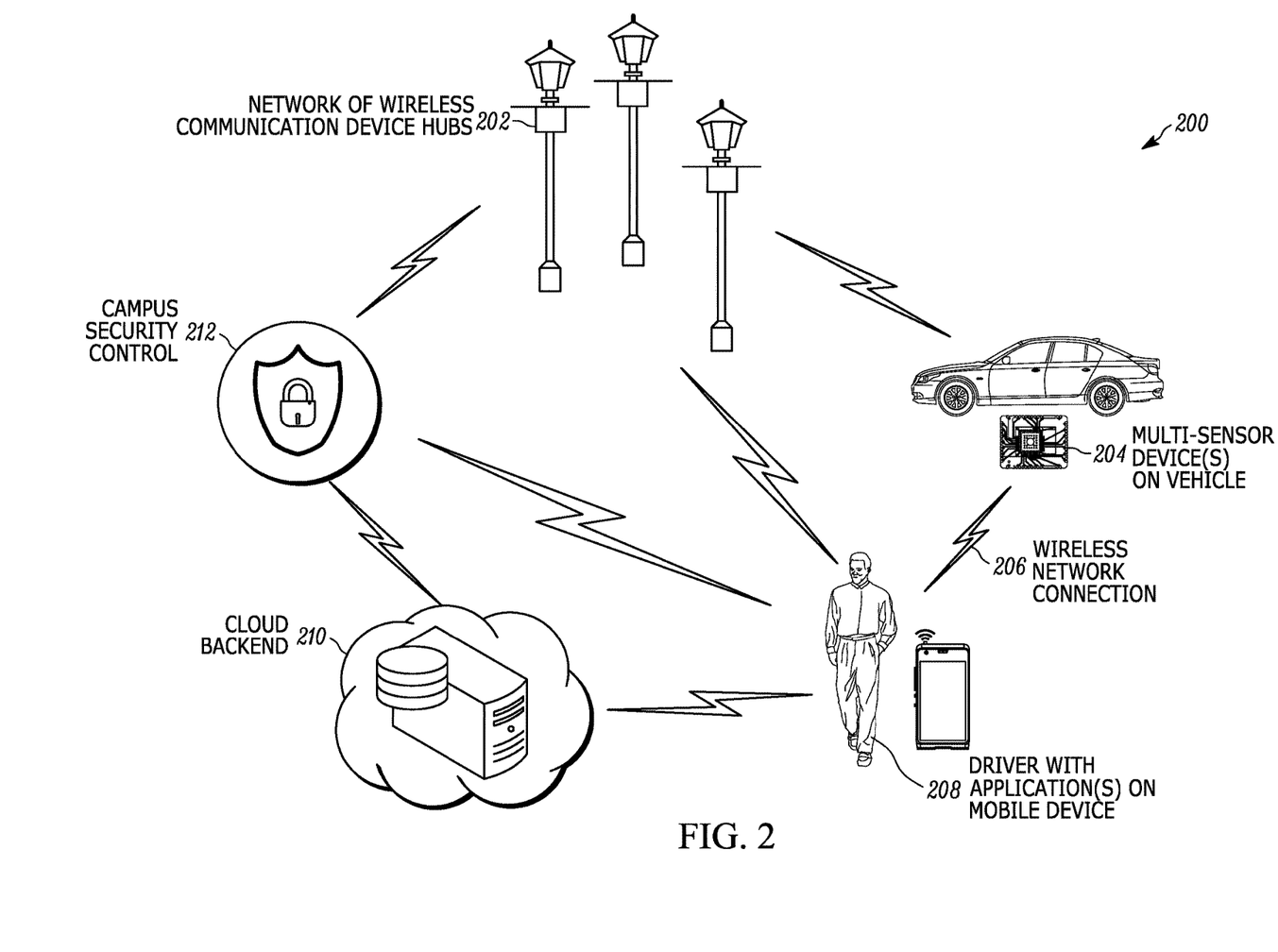
FIG. 2 shows a diagram conceptually illustrating a Driver Parking and Safety Net according to the present teachings.

FIG. 2 conceptually illustrates in more detail an embodiment of a Driver Parking and Safety Net (DPSN) 200, in accordance with the present teachings. It is to be noted that this concept applies to parking maintained by any organization, not just university or college campuses. The "Campus Security Control" 212 in FIG. 2 refers to any facility or department within an organization that has the authority and responsibility over the operations and security of parking lots and garages on that organization's campus. Multi-sensor devices (204) on the vehicles are wirelessly connected to a network of communication device hubs (202) as well as the mobile apps on the drivers' smartphones (208). The mobile apps, in turn, are connected to the Cloud Backend 210 that is connected to the Campus Security Control 212. It is the wireless interconnection 206 and constant (or very frequent) communication between the different components of the system, as depicted in FIG. 2, that enables parking facilitation and safety of all registered drivers in the system and their parked vehicles. Of course, drivers that opt to turn off the monitoring and tracking feature of the system cannot be fully covered by the safety features of the Driver Parking and Safety Net.

Figure 3:
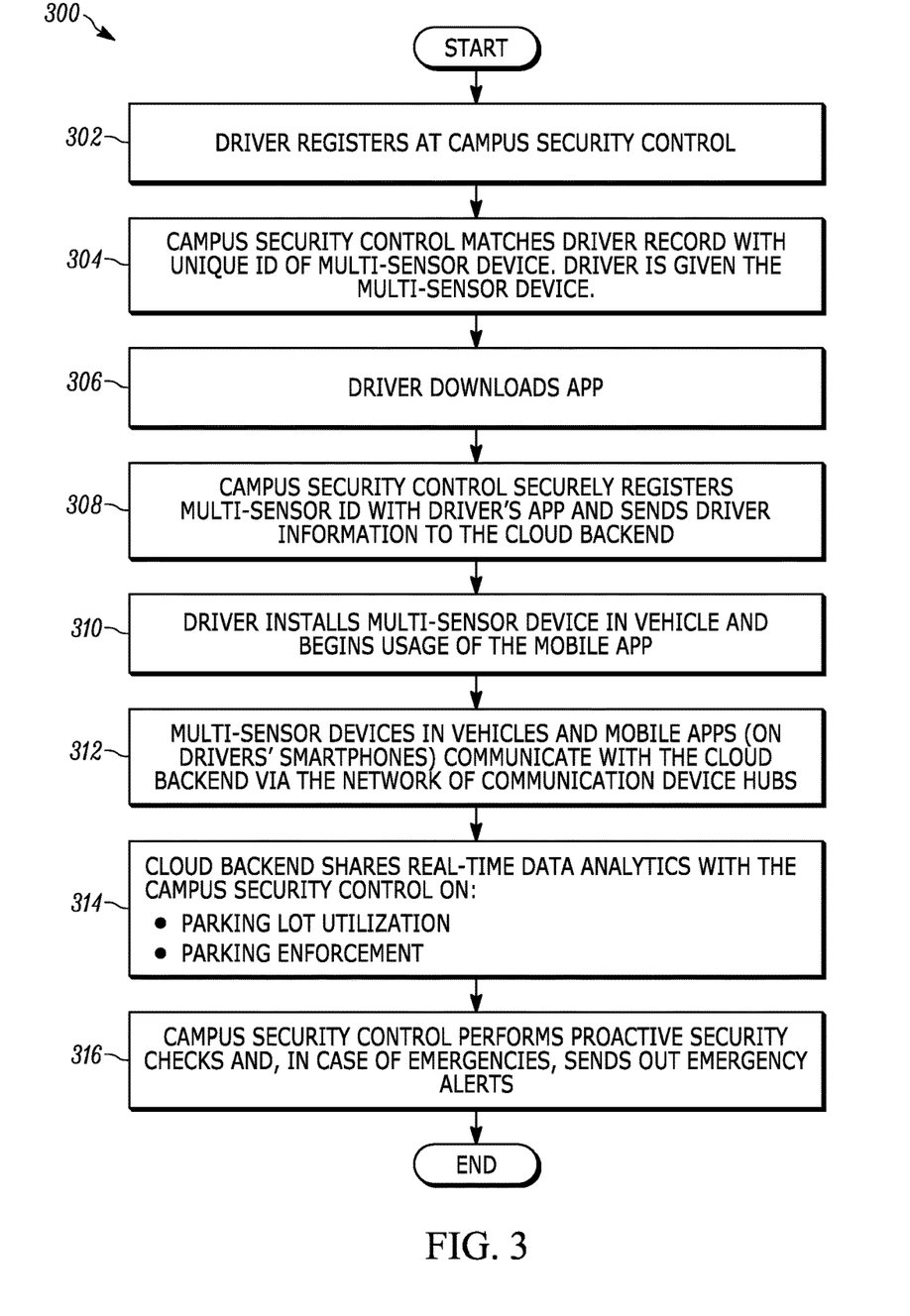
FIG. 3 illustrates a parking system workflow for the parking system embodiment illustrated in FIG. 1.

FIG. 3 shows one example process workflow 300 of the embodiment of the parking system of the present teachings that is illustrated in FIG. 1 (university setting). Functionality of multiple elements within the parking system 100 is demonstrated within the workflow illustrated in FIG. 3. However, also contained within one or more blocks of the workflow is functionality of the Cloud Backend, including, but not limited to: creating a profile for a user comprising a parking pass identifier for an electronic parking pass, a parking authorization level associated with the electronic parking pass, and user data identifying the user and registration of a parking application on a user device; receiving multiple parking pass identifier inputs from a plurality of parking communication hubs; determining, based on the multiple parking pass identifier inputs, parking utilization data indicating current utilization for a plurality of parking lots; determining, based on the user's profile and the parking utilization data, at least one of the plurality of parking lots within which the user is authorized to park to use in determining a user parking authorization indication; communicating the user parking authorization indication to the registered parking application.

Drivers register at the Campus Security control office to get authorization to park on campus parking lots or structures (302). Drivers select the authorization level based on their budget (for example, in some organizations, "blue" permits might be the most inexpensive, followed by "yellow", "green", with "gold" being the most expensive parking permit or authorization level) or on several other factors including, but not limited to, proximity of the lot(s) to their places of study or work, or whether the lot is covered or open. Campus Security records each driver's information in their database and issues them a multi-sensor device (parking device) with a unique, non-personal ID (parking pass identifier) (in 304). The driver (user) downloads the mobile app (parking app) onto his or her personal device (306) and his or her multi-sensor device ID is registered with the mobile app by Campus Security. This ID is also recorded as part of the driver's confidential record (user's profile). This driver record is sent to the Cloud Backend (308). In one embodiment, the multi-sensor device ID is not visible to or modifiable by the driver but is used as a secure authentication and linkage token between the multi-sensor device, mobile app, network of communication hubs, and the Cloud Backend. Campus Security has secure access to the information on the Cloud Backend as well.

The driver deploys the multi-sensor device on his/her vehicle (310). The device can be of different form factors, including, but not limited to, a sticker that can be affixed on the windshield, a device that can be inserted into the OBD II (on-board diagnostics standard) port of the vehicle, a device that can be inserted into the DC power outlet in the vehicle, or a device that can just be placed anywhere within the interior of the vehicle. The teachings herein are not limited by the form factor of the device and locations within the vehicle described above, as they are provided merely as exemplars or alternate embodiments of the innovation. The device can be manufactured from one or a combination of materials including, but not limited to, paper products, plastics, and/or metal.

When a vehicle with a multi-sensor device enters the campus, the driver can invoke the map navigation feature of the mobile app to find a parking lot consistent with the driver's authorization level and preferences also, respectively, referred to herein as a parking authorization level and user preferences. A parking authorization level identifies one or more particular parking lots, and/or parking lots types, and/or parking spaces, and/or parking space types within which a user associated with the electronic parking pass can park. A user preference is any preference identified by a user, which can be used by the Cloud Backend to select parking for the user. For example, if the driver is authorized to park only in "blue" permit lots and pay-by-space lots, the app presents a list of all lots that meet these criteria, with an indication of space availability in each lot. The app gets this information from the Cloud Backend that has information on all parking lots on campus and can filter that with the driver information. The space availability in the lots is updated in real-time and these updates are pushed to the driver's mobile app as soon as it becomes available. The app provides turn-by-turn directions or navigation assistance to the lot selected by the driver.

The above description provides an example of the Cloud backend communicating to the registered parking application a user parking authorization indication, which indicates a set of one or more (in this case all) of a plurality of parking lots of the parking system, with available parking, that satisfy the parking authorization level associated with the electronic parking pass issued to the user. Included in the set of parking lots presented to the user is a first parking lot that the user selects within which the user is authorized to park. Moreover, once the user selects the first parking lot, the Cloud Backend communicates a user parking authorization indication, which indicates a location of the first parking lot for use in navigating a vehicle containing the electronic parking pass to the first parking lot. A user parking authorization indication is any type of message or structured communication or signaling from the Cloud Backend to the user's registered parking application which provides an indication, before or after the user parks a vehicle, of whether the user is authorized to park in a particular lot, for instance, based on the parking authorization level associated with the electronic parking pass.

For a next example, the Cloud Backend receives a first parking pass identifier input from a first communication hub of the plurality of communication hubs indicating that a vehicle containing the electronic parking pass has parked in the first parking lot of the plurality of parking lots, and updates parking utilization data using the first parking pass identifier input. A parking pass identifier input is type of message or structured communication or signaling from a communication hub to the Cloud Backend that contains a parking pass identifier and indicates that a vehicle associated with that parking pass identifier has parked within a particular parking lot, and optionally identifies a particular parking spot and/or location coordinates where the vehicle has parked. The parking utilization data indicates utilization of the parking lots monitored by the Cloud Backed including, but not limited to, the number and/or identity and/or location of unused parking spots within each parking lot monitored by the Cloud Backend.

For a particular example, when the vehicle enters the first parking lot, the network hub in the lot communicates wirelessly with the multi-sensor device, retrieves the unique ID and sends it to the Cloud Backend, where the ID is matched against the corresponding driver record. The Cloud Backend records the time of entry of the vehicle associated with the multi-sensor device. If the vehicle ends up parking in that lot (determined by a combination of sensors on the multi-sensor device that detect when the vehicle in motion has come to a full stop), then that information is also relayed to the Cloud Backend via the network hub. At this point, the Cloud Backend can make an automatic determination if the vehicle is authorized to park in that lot (based on the driver's pre-paid permit and authorization level and the lot type).

This automatic determination can be performed using stored code executable by the Cloud Backend server processor, wherein the code is configured to use the user's profile and the parking utilization data as input to determine at least one of the plurality of parking lots within which the user/vehicle is authorized to park. For a particular example, the parking utilization data can further include the layout of all parking lots under its purview (e.g., number spaces, location of the lot, name/number of the lot, its permit designation, etc.). Effectively a map of all lots that can be pulled up on demand and have the utilization data and location of each vehicle in the lot mapped onto it. This allows the Cloud Backend to determine which spaces are empty and which ones are occupied, in conjunction with the GPS on the mobile apps and the multi-sensor device on the vehicle.

Furthermore, the Cloud Backend can monitor whether a vehicle is authorized to park in the first parking lot. Upon determining, based on the parking authorization level, a parking violation for the vehicle parking in a given parking lot, the Cloud Backend can report the parking violation to the registered parking application. For one example, if the vehicle is not authorized to park in that lot, the Cloud Backend sends an alert notification to the mobile app, cautioning the driver against a parking violation that could result in an expensive ticket. Such a notification could serve as a proactive deterrent against the driver receiving a parking ticket. On the other hand, if the driver is indeed authorized to park in the lot, the time of parking is simply recorded in the log for that driver on the Cloud Backend. If this is a pay-per-space lot, the clock is started on the parking duration for that vehicle.

For another example implementation, the Cloud Backend monitors location of the user using the parking pass identifier received from the registered parking application via one or more of the communication hubs. This can be used to enhance safety for users. Thus, the parking system has the ability to track the driver even while he or she is not in the vehicle, assuming that the driver has not opted out of the tracking feature. This tracking is made possible by the mobile app communicating with the network of communication hubs as the driver walks through campus, within range of the hubs. This tracking is non-intrusive and confidential. That is, the unique multi-sensor device ID that is part of each driver's app is transmitted to the nearest hub, and from the hub to the Cloud Backend. The matching of the multi-sensor device ID with personally identifiable information can only be done at the Cloud Backend and only Campus Security is authorized to access this information. In that regard, it is similar to multiple video cameras recording footage in any public venue. A key difference here is that the bandwidth of information being transferred from each person is much less (just the non-personal multi-sensor device ID). But this information is just as effective in enabling Campus Security to maintain the security and the safety of the driver population on campus.

The tracking enables the Cloud Backend, and in turn the Campus Security personnel, to determine, at any given point in time, the number and location of drivers within range of the hubs that are distributed across campus. This information can be provided in graphical form, superimposed on a map of the campus. This is possible since the location of each multi-sensor device ID (i.e., driver with the mobile app on his/her personal device) can be estimated by the Cloud Backend within a few meters, using a combination of the GPS tracker on the mobile device and the RSSI (received signal strength indicator) of the wireless connection between driver's personal device and the network hubs. This enables Campus Security to proactively send out alerts to specific drivers or groups of drivers in a localized manner (without broadcasting it to the entire driver population on campus), and respond quickly to emergency in-app calls, since the location of the caller (within a few meters) is known. This ability to track a driver even when he or she is not in the vehicle is key to providing a comprehensive Driver Parking and Safety Net.

When the driver is ready to depart from campus, the Cloud Backend can communicate a location of a parking lot and/or a parking spot within the parking lot to the registered parking application for use in navigating the user to the parking lot where his vehicle is parked. For example, the mobile app provides location information (e.g., in map form) on where the vehicle is parked, if the driver requests it on his or her mobile app. This is useful in cases where the driver is not familiar with the campus or has just forgotten in which lot he or she has parked the vehicle. The app can provide this location information, since the multi-sensor device on the vehicle is in periodic communication with one of the network hubs and the hub relays the ID to the Cloud Backend.

For a particular implementation, the location of the hub and thereby the approximate location of the vehicle is mapped by the Cloud Backend software and this information (representing the location of the parking lot and/or the parking spot) is available to the mobile app that shows the location of the vehicle on a map of the campus. In alternative implementations, the Cloud Backend sends coordinates representing the parking lot, the parking spot, and/or the communication hub to the registered parking application to use in providing the turn-by-turn direction to the user.

In cases where the driver is walking by himself or herself to the vehicle late at night, the system has the capability to actively track their progress towards their vehicle to ensure that they reach their vehicle safely. In cases where the drive has to wait for a parking lot shuttle to take him or her to the appropriate parking lot (a common feature on large campuses), the system provides Campus Security with information that allows them to direct the shuttle to only those stops that have drivers waiting for a ride, reducing their wait time and lessening the chance of an attack or physical assault. The activity of the vehicles and drivers on the network, as described above, are encapsulated in 312 in FIG. 3.

The software or stored code running on the Cloud Backend can collect data pertaining to the parked vehicle location, parking start time, travel through the campus on foot, and parking end time, for each registered driver (i.e., person to whom a multi-sensor device has been issued). These data form the basis of rich data analytics that can be used by the campus security organization to enforce parking, determine utilization of the parking lots and garages on campus (314), respond to emergency alerts, or issue proactive safety alerts (316). This data enables drivers to find parking easily and ensures the safety of the drivers on campus when they are away from their vehicles.

Figure 4:
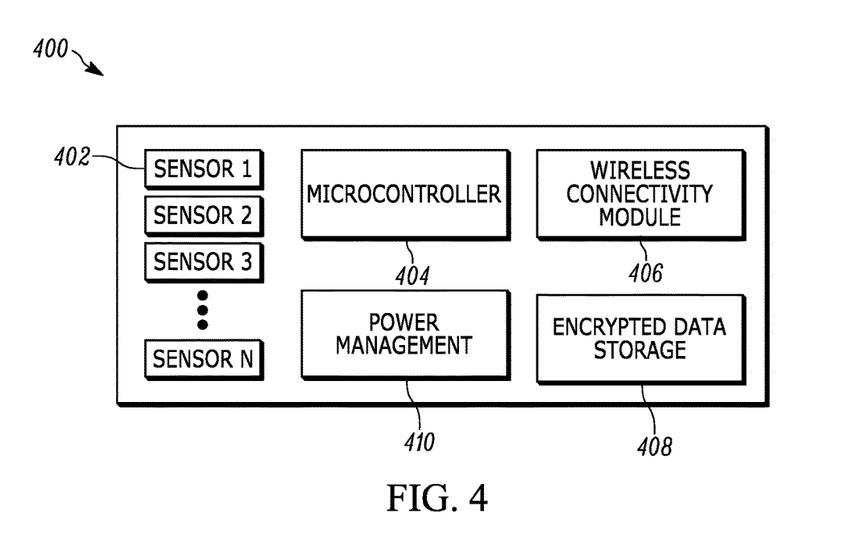
FIG. 4 illustrates a block diagram of an embodiment of a multi-sensor parking device.

FIG. 4 shows the block diagram of a multi-sensor device (400) having elements operatively connected or coupled to enable operation of the device (400) (although such interconnections are not shown). It has a number (set) of sensors that can be used either individually or in combination with one another to transmit data to other components of the system. The sensors 1 through N (402) are configured to detect a set of parameters depending on the type of sensors. The sensors can include, but are not limited to, an accelerometer, gyroscope, magnetometer, pressure sensor, temperature sensor, microphone, loudspeaker, web camera, GPS tracker, haptic vibration motor, or other environment sensors, that are obvious to anyone skilled in the art. In other words, the value of N (the number of sensors on the device) can vary widely between different embodiments of the present teachings. Alternate embodiments of the present teachings are likely to have different combinations or subsets of these sensors present on the device. Yet other embodiments of the present teachings could have the set of sensors split across multiple physical devices installed in different locations of the vehicle. The present teachings cover all such variations.

The sensors can be used individually (e.g., temperature sensor), or in combination to detect significant events that need to be communicated to the nearest network hub and onto the Cloud Backend, or to the mobile app. For example, if the multi-sensor device has an accelerometer and a GPS tracker, then the combination of the two can be used to indicate whether the vehicle is in motion or has come to a halt-useful to determine if the vehicle is parked. Similarly, the combination of the accelerometer, pressure sensor and microphone could indicate an unwanted intrusion into the vehicle or other security breach event to the vehicle (e.g., sound of glass breaking can be picked by the microphone, or abrupt jolt to the body of the vehicle itself results in triggering the accelerometer and the pressure sensor) and so on. Also, as mentioned earlier, the combination of the accelerometer, gyroscope, magnetometer, and pressure sensor can be used to determine the location of the vehicle inside closed parking structures or in places where GPS connectivity is not strong enough, using the technique of pedestrian dead reckoning (PDR).

A parking device processor can be programmed using any suitable code to use the detected set of parameters (in this case using the set of parameters detected using the accelerometer, pressure sensor, and microphone) to determine a security breach event for a vehicle that contains the parking device. This security breach event can be reported to Cloud Backend via a communication hub, which in turn reports the security breach event to the registered parking application for instance via the Campus Security Control. In this manner, the parking system monitors for a security breach event for the vehicle and reports the security breach event to the registered parking application.

The wireless connectivity module (406), also referred to herein as a parking device communication interface, in the multi-sensor device could be one of Bluetooth, Bluetooth Low Energy (BLE), LoRa, Wi-Fi, or any other wireless communication technology, obvious to anyone skilled in the art. The microcontroller module (404), which includes the parking device processor, controls all the other components on the device. The power management module (410), as the name suggests, handles the power to the device. In one embodiment of the present teachings, the power could be supplied by a battery on the device. In other embodiments of the present teachings, the power could be supplied by the vehicle itself (e.g., if the device can be attached to the OBD II port of the vehicle or inserted into a DC power outlet in the vehicle). The present teachings cover all such variations of power management.

The encrypted data storage (408) is used to store the unique, non-personal ID of the multi-sensor device and any other relevant data such as code used by the microcontroller. Storage (408) is capable of storing information temporarily or permanently, such as RAM, ROM, PROM, EPROM, EEPROM, etc. and any combination thereof. This ID is not visible to, or modifiable by the driver, and is used as the authentication and linkage token between the multi-sensor device, mobile app, network hub, and Cloud Backend. This ID is used by the Cloud Backend to access the confidential driver record and in handling the secure payments (e.g., payment for pay-by-space lots, or dynamic authorization upgrades).

Figure 5:
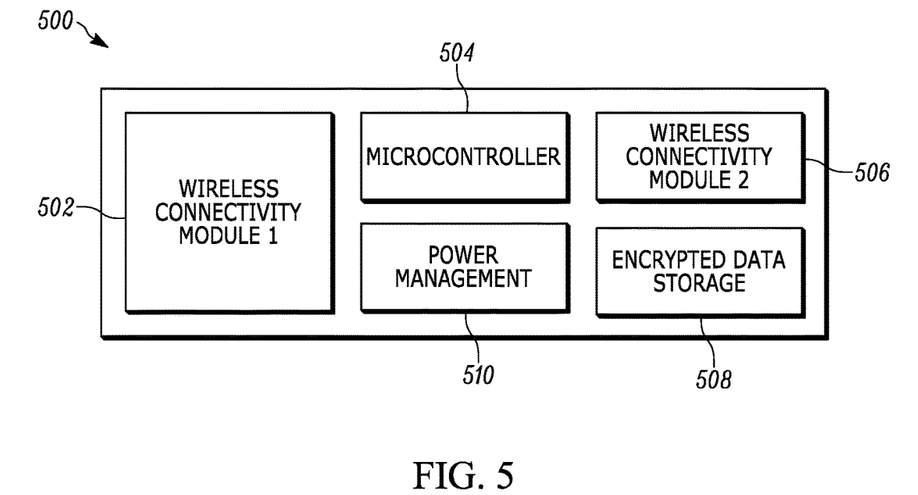
FIG. 5 illustrates a block diagram of an embodiment of a parking communication hub.

FIG. 5 illustrates the block diagram of the network communications hub (500) having elements operatively connected or coupled to enable operation of the hub (500) (although such interconnections are not shown). It includes two wireless connectivity modules (502 and 506) also referred to herein as a hub communication interface, a microcontroller 504 that includes a hub processor, (that controls all other modules on the device), power management (510), and encrypted data storage (508) capable of storing information temporarily or permanently, such as RAM, ROM, PROM, EPROM, EEPROM, etc. and any combination thereof.

In one embodiment of the present teachings, one of the wireless connectivity modules might be for short-range wireless connectivity such as Bluetooth or BLE (Bluetooth Low Energy), Zigbee or any other short-range wireless technology, obvious to anyone skilled in the art. Similarly, the second wireless connectivity module might be for medium to long-range wireless connectivity such as Wi-Fi, cellular (3G/4G/5G), LPWAN (low-power wide-area network), or any other medium to long-range wireless technology, obvious to anyone skilled in the art. Other alternate embodiments of the present teachings could use just a single wireless connectivity module to communicate with both the multi-sensor devices as well as the Cloud Backend, using any of the available wireless technologies, obvious to anyone skilled in the art. The choice of wireless technologies used in the network hub can be determined by the compatibility with other components of the system, and the need to ensure that network hubs are constantly online and connected, and that any outage in one hub is immediately conveyed to the Cloud Backend for appropriate action.

FIG. 5 is also representative of elements within the Cloud Backend. In one embodiment, the Cloud Backend includes: a plurality of server processors 504 (instead of a single microcontroller); a server communication interface including one or both of wireless connectivity modules 502 and/or 504; a power management module 510; and a plurality of databases 508 (instead of just one encrypted storage element) that are used to store the users' profiles, parking utilization data, campus maps, parking regulations, and code executable by the server processor(s).

Figure 6:
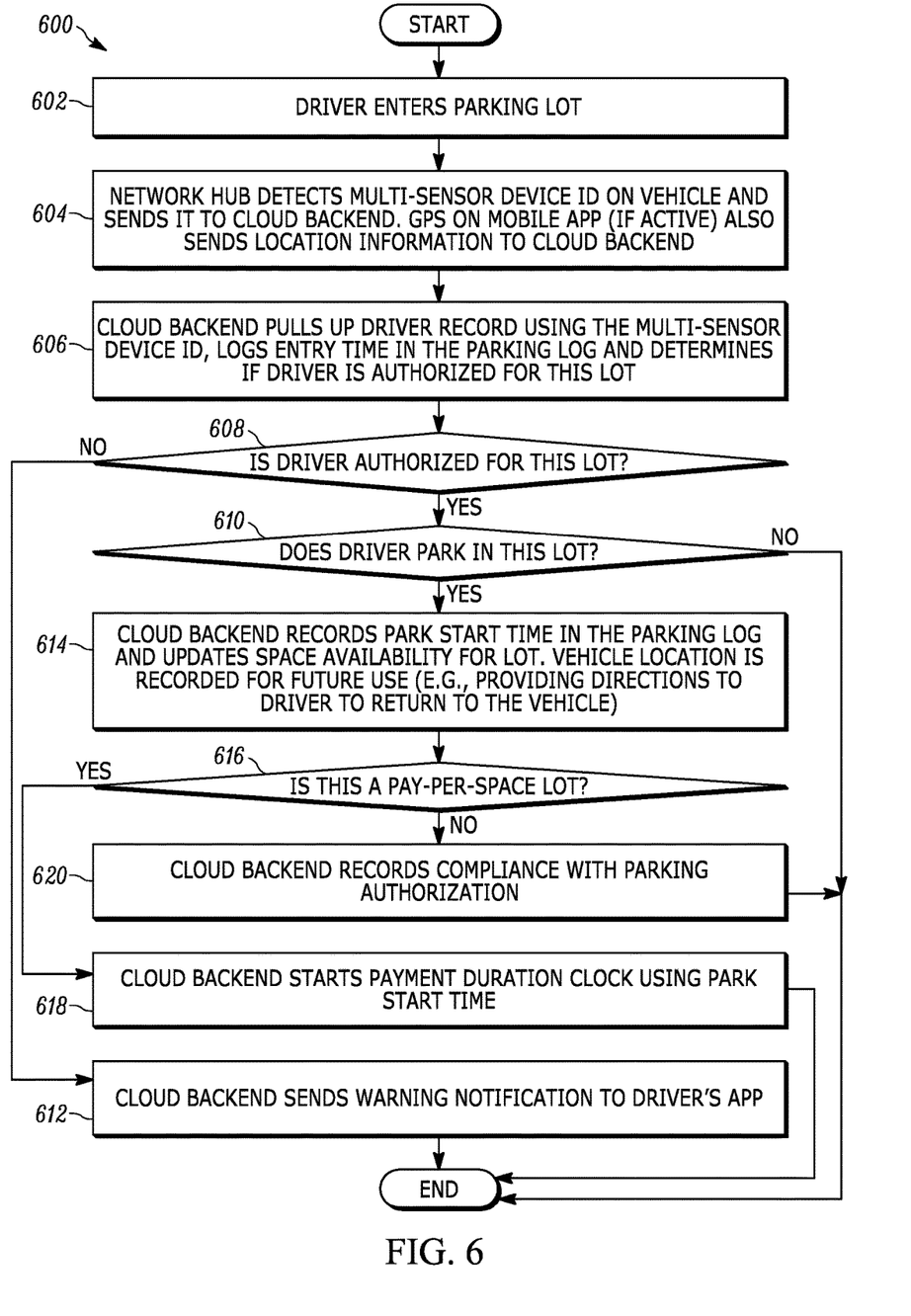
FIG. 6 illustrates a parking system workflow associated with entering a parking lot, in accordance with the present teachings.

FIG. 6 is a flowchart (600) that illustrates one example workflow associated with a driver entering a parking lot (602) that is equipped with our system. The detection of the vehicle with the multi-sensor device ID is done by both the network hub (when the vehicle is in range) and directly by the Cloud Backend (604) that communicates with the driver's mobile app (assuming network connectivity exists in that parking lot). This dual-path detection of the multi-sensor device ID (wherever possible) serves as an additional security check to determine if the vehicle does indeed belong to the driver. The Cloud Backend can determine if the driver is authorized for this lot using the driver record information (606).

In the event that the driver is not authorized, a warning notification is immediately sent to the driver app indicating a potential parking violation (612). If the driver is indeed authorized and it is a pay-per-space lot, the parking duration clock is started (618), once the Cloud Backend has detected that the vehicle has come to a full stop (614). The Cloud Backend also records the location of the vehicle for future use (e.g., to guide the driver back to the parked vehicle using the navigation feature of the mobile app). If the lot is a permit parking lot, the Cloud Backend records compliance with the driver's parking authorization (620). The detection of vehicle stoppage can be performed using readings from a combination of sensors on the multi-sensor device and the driver's personal device (e.g., accelerometer and GPS tracker). FIG. 6 does not explicitly show the case where the driver decides to ignore the parking violation warning sent to the mobile app and parks illegally anyway. That is handled in FIG. 7.

Figure 7:
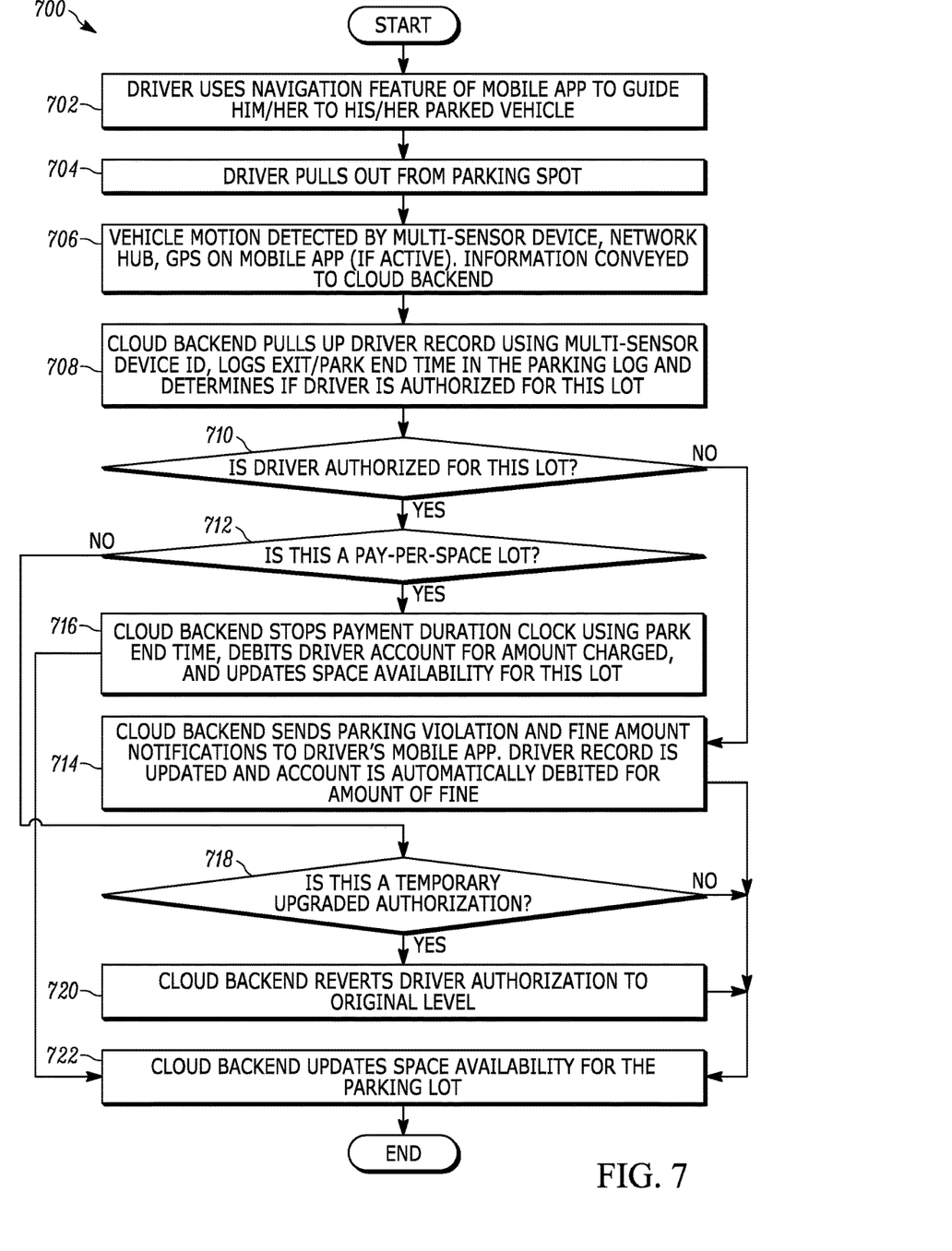
FIG. 7 illustrates a parking system workflow associated with exiting a parking lot, in accordance with the present teachings.

FIG. 7 is a flowchart (700) that illustrates one example workflow associated with a driver using the turn-by-turn navigation feature of the mobile app to locate his/her vehicle (702) and exit a parking lot (704) that is equipped with our system. First, the motion of the vehicle can be detected by a combination of sensors on the multi-sensor device and conveyed to the Cloud Backend via the nearest network hub (706). The driver's mobile app might also convey the motion information to the Cloud Backend (assuming reliable GPS connectivity in the parking lot). Again, this dual-path detection of the multi-sensor device ID (wherever possible) can serve as an additional security check to ensure that the vehicle belongs to that driver. The Cloud Backend determines if the vehicle is authorized for this parking lot (708). If the vehicle was parked illegally in this lot, then the parking violation notice and fine amount notification are sent to the driver's mobile app (714). The appropriate fine amount is automatically deducted from the driver's account.

In case of the driver being authorized for this lot and it is a pay-per-space lot (710 and 712), then the parking duration clock is stopped, once the vehicle motion is detected and the appropriate amount is automatically debited from the driver's account (716), which can be reported to the mobile app. Accordingly, for one implementation of the parking system, in block 618 the parking system (e.g., the Cloud Backend) monitors cost for the vehicle parking in the parking. The parking system (e.g., the Cloud Backend) receives a second parking pass identifier input from the first communication hub indicating that the vehicle containing the electronic parking pass has left the first parking lot and determining a final cost for the vehicle parking in the first parking lot (716). The Cloud Backend the updates the parking utilization data using the second parking pass identifier input (722) and reports the final cost to the registered parking application. In case the driver had obtained a temporary authorization upgrade, that upgrade is removed and the driver's authorization is reverted to its original level (718 and 720). Dynamic upgrades are covered in more detail in FIG. 8.

Automatic debit of the driver's payment account is contingent upon accurate determination of vehicle stoppage (to begin the parking duration clock) and vehicle motion (to stop the parking duration clock). In situations where accurate determination of vehicle stoppage and motion cannot be accomplished (due to network or GPS connectivity problems, etc.), the driver mobile app can switch to a manual confirmation mode, wherein the driver can be asked to input his/her confirmation of vehicle parking and the payment transaction.

Figure 8:
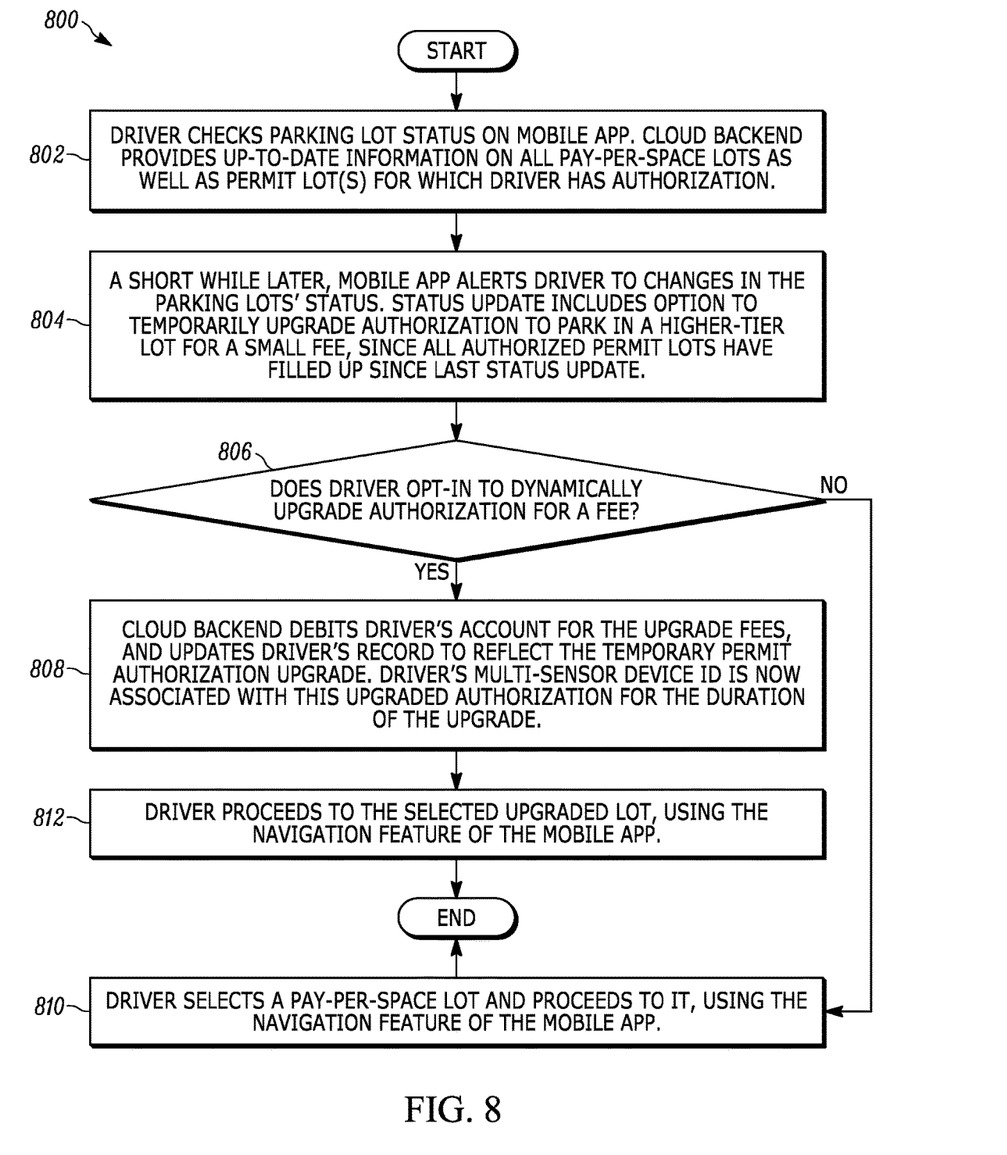
FIG. 8 illustrates a parking system workflow for dynamically upgrading a parking authorization level, in accordance with the present teachings.

FIG. 8 shows an example flowchart (800) for dynamic permit authorization upgrade, in accordance with the present teachings. A driver can check the status availability of the parking lots using the mobile app (802), even while away from campus or organization that has implemented the teachings herein. This is possible since the mobile app is wirelessly connected to the Cloud Backend and can check status availability of the parking lots at any time. Due to this wireless connection, it is also possible for the Cloud Backend to push notifications in real-time to the app based on any status changes. One such scenario is shown in 804.

All parking lots in which the driver is authorized to park are full, but Campus Security Control has now made available a few spaces in one or more higher-tier authorized lots for a small "authorization upgrade fee". This information is conveyed to the Cloud Backend and onto the mobile apps, using the wireless connection between the three elements of the system. The specific parking spots available, upgrade fees for each of them, and the duration of the upgrade are displayed on the mobile app. At this point, the driver has the option to select any of these temporary authorization upgrades or decline all the upgrade offers altogether (806). If the driver opts for a temporary upgrade, the Cloud Backend debits the driver's account for the upgrade fees and updates the driver's record to reflect the temporary permit authorization upgrade. The driver's multi-sensor device ID is now associated with this upgraded authorization for the duration of the upgrade. The driver proceeds to the selected lot using the navigation feature of the mobile app (812). If the driver declines all upgrade offers, then he/she selects one of the pay-per-space lots displayed on the mobile app and proceeds to it, using the navigation feature of the mobile app (810). Once the driver leaves the lot, the temporary permit upgrade is revoked or removed (as shown in 718 and 720).

For this example implementation, the parking system, e.g., the Cloud Backend, performs the following functionality. Before the user parks, the Cloud Backend: determines, based on at least one parameter, a first parking lot of the plurality of parking lots having a first parking authorization level that exceeds the parking authorization level associated with the electronic parking pass; and determines a cost to park in the first parking lot based on the first parking authorization level, wherein the user parking authorization indication indicates the first parking lot and the cost for parking in the first parking lot. The at least one parameter can be a user preference stored in the user profile, a destination of the user (so that the user can park closest to her destination for instance, parking availability, etc.

When the user parks her vehicle in the parking lot, the Cloud Backend: receives a first parking pass identifier input from a first communication hub of the plurality of communication hubs indicating that a vehicle containing the electronic parking pass has parked in the first parking lot; updates the parking utilization data using the first parking pass identifier input; and temporarily associates the first parking authorization level of the first parking lot with the electronic parking pass. Upon the user leaving the parking lot, the Cloud Backend: receives a second parking pass identifier input from the first communication hub indicating that the vehicle containing the electronic parking pass has left the first parking lot; updates the parking utilization data using the second parking pass identifier input; and disassociates the first parking authorization level of the first parking lot from the electronic parking pass.

It is worth noting that the association made by the Cloud Backend between the multi-sensor device ID and the temporary permit upgrade described in 808 is important, as any automated checks of the parking lots, made by the Campus Security Control during the duration of the upgrade, can ensure that the driver's vehicle is shown as having the correct authorization, and not be flagged for violating the authorization permit assigned to that ID at the time the multi-sensor device was issued to the driver. Once the upgrade period expires, the multi-sensor device ID automatically reverts to the original permit authorization. The mobile app proactively alerts the driver to the impending expiry of the temporary upgrade so that the driver can exit the lot without incurring any permit violation penalties.

For any organization (e.g., university, community college, business) that provides both permit-based and pay-per-space parking, it is often necessary to provide parking for one-off visitors to the facility. These one-off visitors include, but are not limited to, visiting parents of students enrolled in the university, ticket-holders to specific events such as football games, concerts, or other artistic performances, visiting business associates, and so on. The teachings herein provide for systems and methods to accommodate such one-off users of parking. Since it might be prohibitively expensive or just not feasible for Campus Security Control to issue physical multi-sensor devices to each one-off visitor who might be on campus for just the duration of the event, our innovation provides for a "virtual" parking pass associated with a "virtual" multi-sensor (parking) device ID to be issued to each visitor. Thus, in this case the electronic parking pass is a virtual parking pass that is not associated or linked with a physical parking device. This ID identifies the holder to be a visitor and not in possession of a physical multi-sensor device in his/her vehicle. The virtual multi-sensor device ID is still registered with the mobile app and known to both the Cloud Backend and Campus Security Control.

Accordingly, for this implementation example, the user's profile is a visitor user profile, wherein the parking authorization level grants access to a set of one or more parking lots of the plurality of parking lots for a shorter duration than for a resident user profile. For one example, the resident user profile is a stored profile linked to a user that has been issued a physical electronic parking pass. For one scenario, as explained in more detail below by reference to FIG. 9, the parking authorization level grants access to the set of parking lots for a set of one or more events.

Figure 9:
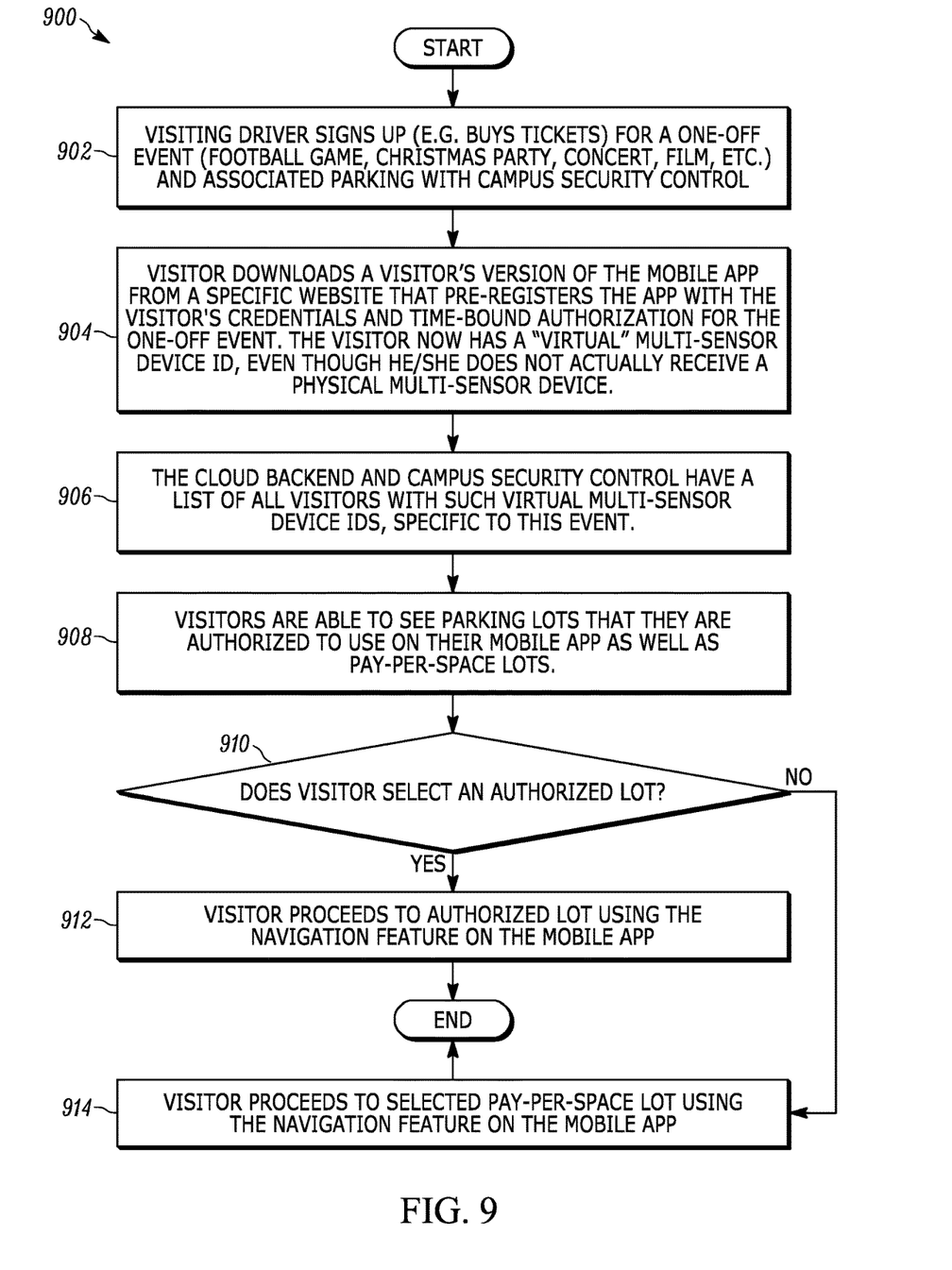
FIG. 9 illustrates a parking system workflow for visitor parking, in accordance with the present teachings.

FIG. 9 shows an example flowchart (900) for visitor parking, in accordance with an embodiment of the present teachings. A visiting driver signs up for the one-off event and pays Campus Security Control for parking (902). This could be done either online (website) or through any other means typically associated with event ticket purchases, well-known to those skilled in the art. The visitor is directed to a specific website, controlled by the Cloud Backend, to download the visitor's version of the mobile app. The mobile app is pre-registered with the visitor's credentials and time-bound parking authorization for the one-off event (904). The Cloud Backend associates a "virtual" multi-sensor device ID with the mobile app and the visitor's record. This ID is not known to the visitor, nor can it be retrieved by the visitor, just like the regular multi-sensor device ID issued to regular users of campus parking. However, this virtual ID allows the visitor to be incorporated into the Driver Parking and Safety Net described in FIG. 2.

Once all sign-ups for the event have been completed, the Cloud Backend and Campus Security Control have a list of all visitors with such virtual multi-sensor device IDs, specific to the event (906). The visitors' mobile app behaves in similar fashion to the regular (resident) user's app, in that it displays all the parking lots specific to the visitor's authorization, as well as all pay-per-space lots (908). The visitor has the option to select either the authorized lot (that has already been paid for, as part of the sign-up for the one-off event) or to pay extra by opting to park in a pay-per-space lot (910), presumably because it might be closer to the event venue. If the visitor selects an authorized lot, the navigation feature in the mobile app can guide him/her to the selected lot (912). Similarly, navigation guidance is provided to the pay-per-space lot selected by the user (914).

One example benefit from the description above and FIG. 9 is that the present teachings provides the flexibility to be used by one-off users of the parking facilities that implement our systems and methods, even without a physical multi-sensor device. The absence of the multi-sensor device does mean that the visitor cannot gain the benefits of the multiple sensors on the device (e.g., intrusion detection) and the vehicle itself cannot be tracked by the networked communication device hubs, but since the visitor's stay on the premises is limited both in terms of location and time period (unlike regular users of the parking facilities), the lack of a physical device does not adversely affect the user experience or the potential for new revenue for the organization implementing the system. The visitors can still opt to park in pay-per-space lots if those lots are closer to the event venue, resulting in increased revenue for the event organizers.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, the terms "comprises," "comprising," "has," "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially," "essentially," "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to," "configured with," "arranged to," "arranged with," "capable of" and any like or similar terms means that referenced elements have a physical arrangement and/or physical coupling and/or connectivity with other elements in an inactive state. This physical arrangement and/or physical coupling and/or connectivity while in the inactive state enables the elements to perform stated functionality while in the active state. Although the various circuit schematics shown herein depict certain example arrangement of elements, additional intervening elements, devices, features, or components may be present in an actual embodiment, assuming that the functionality of the given circuit is not adversely affected.

Also, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A parking system comprising:
   a server communication interface;
   a server processor coupled to the server communication interface;
   a stored profile for a user, the user's profile comprising a parking pass identifier for a parking device, a parking authorization level associated with the parking device, and user data identifying the user and registration of a parking application on a user device;
   stored parking utilization data indicating current utilization for a plurality of parking lots, wherein the parking utilization data is determined based on multiple parking pass identifier inputs received from a plurality of parking communication hubs;
   stored code executable by the server processor, wherein the code is configured to use the user's profile and the parking utilization data as input to determine at least one of the plurality of parking lots within which the user is authorized to park and to output a user parking authorization indication for communicating to the registered parking application using the server communication interface; and
   the parking device comprising:
     a parking device communication interface;
     a parking device storage coupled to the parking device communication interface and having the parking pass identifier stored thereon;
     a set of sensors configured to detect a set of parameters; and
     a parking device processor programmed to use the detected set of parameters to determine a security breach event for a vehicle that contains the parking device.

2. The parking system of claim 1 further comprising the plurality of parking communication hubs, each comprising:
   a hub communication interface configured to wirelessly connect to the server communication interface and the parking device communication interface; and
   a hub processor coupled to the hub communication interface and configured to retrieve the parking pass identifier from the parking device and provide the parking pass identifier as one of the multiple parking pass identifier inputs.

3. A method performed by a parking system, the method comprising:
   creating a profile for a user comprising a parking pass identifier for a physical parking device for placement in a vehicle, the parking pass identifier stored in the physical parking device, a parking authorization level associated with the physical parking device, and user data identifying the user and registration of a parking application on a user device separate from the physical parking device;

receiving multiple parking pass identifier inputs from a plurality of parking communication hubs;

determining, based on the multiple parking pass identifier inputs, parking utilization data indicating current utilization for a plurality of parking lots;

determining, based on the user's profile and the parking utilization data, at least one of the plurality of parking lots within which the user is authorized to park to use in determining a user parking authorization indication;

communicating the user parking authorization indication to the registered parking application.

4. The method of claim 3, wherein the user parking authorization indication indicates a subset of the plurality of parking lots that satisfy the parking authorization level associated with the physical parking device.

5. The method of claim 3, wherein the user parking authorization indication indicates a first parking lot of the plurality of parking lots within which the user is authorized to park and indicates a location of the first parking lot for use in navigating a vehicle containing the physical parking device to the first parking lot.

6. The method of claim 3 further comprising:

receiving a first parking pass identifier input from a first communication hub of the plurality of communication hubs indicating that a vehicle containing the physical parking device has parked in a first parking lot of the plurality of parking lots, the first parking pass identifier input received by the first communication hub from the physical parking device;

updating the parking utilization data using the first parking pass identifier input.

7. The method of claim 6 further comprising communicating a location of the first parking lot to the registered parking application for use in navigating the user to the first parking lot.

8. The method of claim 6 further comprising monitoring location of the user using the parking pass identifier received from the registered parking application via one or more of the communication hubs.

9. The method of claim 6 further comprising:

monitoring for a security breach event for the vehicle;

reporting the security breach event to the registered parking application.

10. The method of claim 6 further comprising:

monitoring whether the vehicle is authorized to park in the first parking lot;

upon determining, based on the parking authorization level, a parking violation for the vehicle parking in the first parking lot, reporting the parking violation to the registered parking application.

11. The method of claim 6 further comprising:

monitoring cost for the vehicle parking in the first parking lot;

receiving a second parking pass identifier input from the first communication hub indicating that the vehicle containing the physical parking device has left the first parking lot, and determining a final cost for the vehicle parking in the first parking lot, the second parking pass identifier input received by the first communication hub from the physical parking device;

updating the parking utilization data using the second parking pass identifier input; and reporting the final cost to the registered parking application.

12. The method of claim 3, wherein the user's profile is a visitor user profile, wherein the parking authorization level grants access to a subset of parking lots of the plurality of parking lots for a shorter duration than for a resident user profile.

13. The method of claim 12, wherein the parking authorization level grants access to the set of parking lots for a set of events.

14. A method performed by a parking system, the method comprising:

creating a profile for a user comprising a parking pass identifier for an electronic parking pass, a parking authorization level associated with the electronic parking pass, and user data identifying the user and registration of a parking application on a user device;

receiving multiple parking pass identifier inputs from a plurality of parking communication hubs;

determining, based on the multiple parking pass identifier inputs, parking utilization data indicating current utilization for a plurality of parking lots;

determining, based on the user's profile and the parking utilization data, at least one of the plurality of parking lots within which the user is authorized to park to use in determining a user parking authorization indication;

communicating the user parking authorization indication to the registered parking application;

determining, based on at least one parameter, a first parking lot of the plurality of parking lots having a first parking authorization level that exceeds the parking authorization level associated with the electronic parking pass;

determining a cost to park in the first parking lot based on the first parking authorization level; and wherein the user parking authorization indication indicates the first parking lot and the cost for parking in the first parking lot.

15. The method of claim 14 further comprising:

receiving a first parking pass identifier input from a first communication hub of the plurality of communication hubs indicating that a vehicle containing the electronic parking pass has parked in the first parking lot;

updating the parking utilization data using the first parking pass identifier input; and temporarily associating the first parking authorization level of the first parking lot with the electronic parking pass.

16. The method of claim 15 further comprising:

receiving a second parking pass identifier input from the first communication hub indicating that the vehicle containing the electronic parking pass has left the first parking lot;

updating the parking utilization data using the second parking pass identifier input; and disassociating the first parking authorization level of the first parking lot from the electronic parking pass.

17. The method of claim 14, wherein the at least one parameter comprises at least one of a user preference within the user's profile or a destination location for the user.

18. The method of claim 14, wherein the electronic parking pass is a virtual parking pass, wherein the parking pass identifier is not linked to a physical parking device.

19. The method of claim 14, wherein the electronic parking pass is a physical parking device, and the parking pass identifier is linked to the physical parking device.

* * * * *

UNITED STATES PATENT AND TRADEMARK OFFICE
CERTIFICATE OF CORRECTION

PATENT NO. : 10,410,445 B2
APPLICATION NO. : 15/912459
DATED : September 10, 2019
INVENTOR(S) : Yeshwant Kumar Muthusamy It is certified that error appears in the above-identified patent and that said Letters Patent is hereby corrected as shown below:

On the Title Page

The Assignee should read --YESHVIK SOLUTIONS, LLC--.

Signed and Sealed this
Tenth Day of March, 2020

Andrei Iancu
*Director of the United States Patent and Trademark Office*